US012290925B2

(12) United States Patent
Yi et al.

(10) Patent No.: US 12,290,925 B2
(45) Date of Patent: May 6, 2025

(54) PARALLEL MECHANISM

(71) Applicants: INDUSTRY-UNIVERSITY COOPERATION FOUNDATION HANYANG UNIVERSITY ERICA CAMPUS, Ansan-si (KR); KOREA UNIVERSITY RESEARCH AND BUSINESS FOUNDATION, SEJONG CAMPUS, Sejong-si (KR)

(72) Inventors: Byung Ju Yi, Ansan-si (KR); Hyun Hwan Jeong, Sejong-si (KR)

(73) Assignees: INDUSTRY-UNIVERSITY COOPERATION FOUNDATION HANYANG UNIVERSITY ERICA CAMPUS, Ansan-si (KR); KOREA UNIVERSITY RESEARCH AND BUSINESS FOUNDTION, SEJONG CAMPUS, Sejong-si (KR)

( * ) Notice: Subject to any disclaimer, the term of this patent is extended or adjusted under 35 U.S.C. 154(b) by 162 days.

(21) Appl. No.: 18/163,553

(22) Filed: Feb. 2, 2023

(65) Prior Publication Data
US 2023/0173662 A1 Jun. 8, 2023

Related U.S. Application Data

(63) Continuation of application No. PCT/KR2021/015354, filed on Oct. 28, 2021.

(30) Foreign Application Priority Data

Oct. 28, 2020 (KR) .................. 10-2020-0141502
Oct. 25, 2021 (KR) .................. 10-2021-0142605

(51) Int. Cl.
*B25J 9/10* (2006.01)
*B25J 19/00* (2006.01)

(52) U.S. Cl.
CPC .............. *B25J 9/106* (2013.01); *B25J 9/102* (2013.01); *B25J 19/0029* (2013.01)

(58) Field of Classification Search
CPC ... G05G 11/00; B25J 9/06; B25J 11/00; B25J 18/04; B25J 18/025; F16H 21/54; F16H 19/08
(Continued)

(56) References Cited

U.S. PATENT DOCUMENTS 5,893,296 A * 4/1999 Rosheim ................. G05G 5/03
74/490.03
2013/0142608 A1 6/2013 Zhang et al.
2018/0290294 A1* 10/2018 Nose ........................ B25J 9/102

FOREIGN PATENT DOCUMENTS

EP 2 762 749 A1 8/2014
JP 2013-076427 A 4/2013
(Continued)

OTHER PUBLICATIONS

Hyunhwan Jeong, et al., "Development of a New 2-DOF Wrist Mechanism Using Reverse Motion Transmission", IEEE Robotics and Automation Letters, Oct. 2021, pp. 6947 to 6954, vol. 6, No. 4.
(Continued)

*Primary Examiner* — T. Scott Fix
(74) *Attorney, Agent, or Firm* — Sughrue Mion, PLLC

(57) ABSTRACT

Provided is a parallel mechanism consisting of: a first module including a first plate having a first hollow formed therein; a second module disposed to be spaced apart from the first module, and including a second plate having a second hollow formed therein; and a power transmission unit provided in a space between the first and second modules, and including a third plate connecting the first and second modules in parallel, wherein the first and second modules form a symmetrical structure on the basis of the power transmission unit, a first range of motion in the first
(Continued)

module is amplified, by means of the symmetrical structure, to a second range of motion that is wider than the first range of motion in the second module, a working space is formed in a space communicating with the first and second hollows, and the third plate is provided outside the working space.

11 Claims, 14 Drawing Sheets

(58) Field of Classification Search
USPC .................. 74/490.03, 490.05, 99 R, 89.14
See application file for complete search history.

(56) References Cited

FOREIGN PATENT DOCUMENTS

| | | |
|---|---|---|
| KR | 10-0820321 B1 | 4/2008 |
| KR | 10-1021172 B1 | 3/2011 |
| KR | 10-2011-0061026 A | 6/2011 |
| KR | 10-2009291 B1 | 8/2019 |
| KR | 10-2020-0081202 A | 7/2020 |

OTHER PUBLICATIONS

International Search Report for PCT/KR2021/015354 dated Feb. 7, 2022 [PCT/ISA/210].

* cited by examiner

PARALLEL MECHANISM

TECHNICAL FIELD

The present invention relates to a parallel mechanism, and more particularly, to a parallel mechanism having an amplified motion range and an excellent space utilization.

BACKGROUND ART

A conventional robot joint system may be provided, for example, as a serial connection type or parallel connection type according to a coupling structure constituting a robot joint.

The conventional robot joint system configured as a series-connected structure may ensure a wide motion range of the robot joint.

However, the robot joint system formed in the series-connected structure has insufficient structural stiffness compared to a robot joint system formed in a parallel connection type structure.

In addition, the conventional robot joint system formed in a parallel-connected structure has an excellent structural stiffness compared to the above-described robot joint system formed in the serial-connection type structure, however, each joint formed in a parallel structure may require a wide joint rotation space for rotation.

Accordingly, in the robot joint system, there is a need for a parallel mechanism capable of providing stiffness higher than that of the series-connection type structure, and improving the disadvantage of requiring a wide joint rotation space.

DISCLOSURE

Technical Problem

The technical problem to be solved by the present invention is to provide a parallel mechanism having an amplified motion range.

Another technical problem to be solved by the present invention is to provide a parallel mechanism having an excellent space utilization.

Still another technical problem to be solved by the present invention is to provide a mechanism having an excellent stiffness.

Still another technical problem to be solved by the present invention is to provide a mechanism capable of precise control.

The technical problems to be solved by the present invention are not limited to the above description.

Technical Solution

In order to solve the above-mentioned technical problems, the present invention provides a parallel mechanism.

According to one embodiment, the parallel mechanism includes: a first module including a first plate having a first hollow formed therein; a second module disposed to be spaced apart from the first module, and including a second plate having a second hollow formed therein; and a power transmission unit provided in a space between the first and second modules, and including a third plate connecting the first and second modules in parallel, wherein the first and second modules form a symmetrical structure about the power transmission unit as a center, in which a first range of motion in the first module is amplified, by means of the symmetrical structure, to a second range of motion that is wider than the first range of motion in the second module, a working space is formed in a space communicating with the first and second hollows, and the third plate is provided outside the working space.

According to one embodiment, the first module may include: a first active rotational joint provided inside the first plate and rotated in a first direction; a first link for transmitting rotational motion in the first direction from the first active rotational joint; a second active rotational joint provided outside the first plate and rotated in a second direction; a first passive rotational joint for transmitting rotational motion in the second direction from the second active rotational joint; and a second link for transmitting rotational motion in the second direction from the first passive rotational joint.

According to one embodiment, the power transmission unit may include: a first power transmission unit provided on one side of the third plate and converting rotational motion into rotational motion in a third direction, which is a reverse direction of the rotational motion in the first direction; and a second power transmission unit provided on an opposite side of the third plate and converting rotational motion into rotational motion in a fourth direction, which is a reverse direction of the rotational motion in the second direction.

According to one embodiment, the second module may include: a third link for transmitting rotational motion in the third direction from the first power transmission unit; a second passive rotational joint provided inside the second plate and transmitting rotational motion in the third direction from the third link; a fourth link for transmitting rotational motion in the fourth direction from the second power transmission unit; and a third passive rotational joint provided outside the second plate and transmitting rotational motion in the fourth direction from the fourth link.

According to one embodiment, the parallel mechanism may further include: a first rotation driving unit for generating rotational motion of the first active rotational joint in the first direction; and a second rotation driving unit for generating rotational motion of the second active rotational joint in the second direction.

According to one embodiment, the first power transmission unit may include: a first gear rotated in the first direction; and a second gear rotated in the third direction, and the second power transmission unit may include: a third gear rotated in the second direction; and a fourth gear rotated in the fourth direction.

According to one embodiment, an end effector may be coupled to one side of the first plate.

According to one embodiment, a wire for driving the end effector may be connected to the end effector, and the wire for driving the end effector may pass through the second hollow, the working space and the first hollow.

According to one embodiment, the end effector may have freedom degree 2 by the first and second rotation driving units, and when the end effector is driven with the freedom degree 2, the wire for driving the end effector may be positioned in the working space.

According to one embodiment, the freedom degree 2 may include pitch motion and yaw motion, in which the pitch motion may be performed in a motion range of −45° or more to +90° or less, and the yaw motion may be performed in a motion range of −65° or more to +50° or less.

According to one embodiment, the end effector may have a stiffness in a range greater than $9 \times 10^3$ N/m and less than $10 \times 10^3$ N/m with respect to an external force in a range of 10 N or more to 24 N or less.

According to one embodiment, the third plate may be provided outside the working space and provided in a link shape.

Advantageous Effects

The embodiment of the present invention provides the parallel mechanism including: a first module including a first plate having a first hollow foamed therein; a second module disposed to be spaced apart from the first module, and including a second plate having a second hollow formed therein; and a power transmission unit provided in a space between the first and second modules, and including a third plate connecting the first and second modules in parallel, wherein the first and second modules form a symmetrical structure about the power transmission unit, in which a first range of motion in the first module is amplified, by means of the symmetrical structure, to a second range of motion that is wider than the first range of motion in the second module, a working space is formed in a space communicating with the first and second hollows, and the third plate is provided outside the working space.

Accordingly, when the motion range is amplified as described above, the motion range of the end effector coupled to the one side of the second plate can be widened.

In addition, when the end effector is driven, by foaming the working space as described above, the wire for driving the end effector may be positioned in the working space, so that the excellent space utilization can be implemented.

BEST MODE

Figure 1:
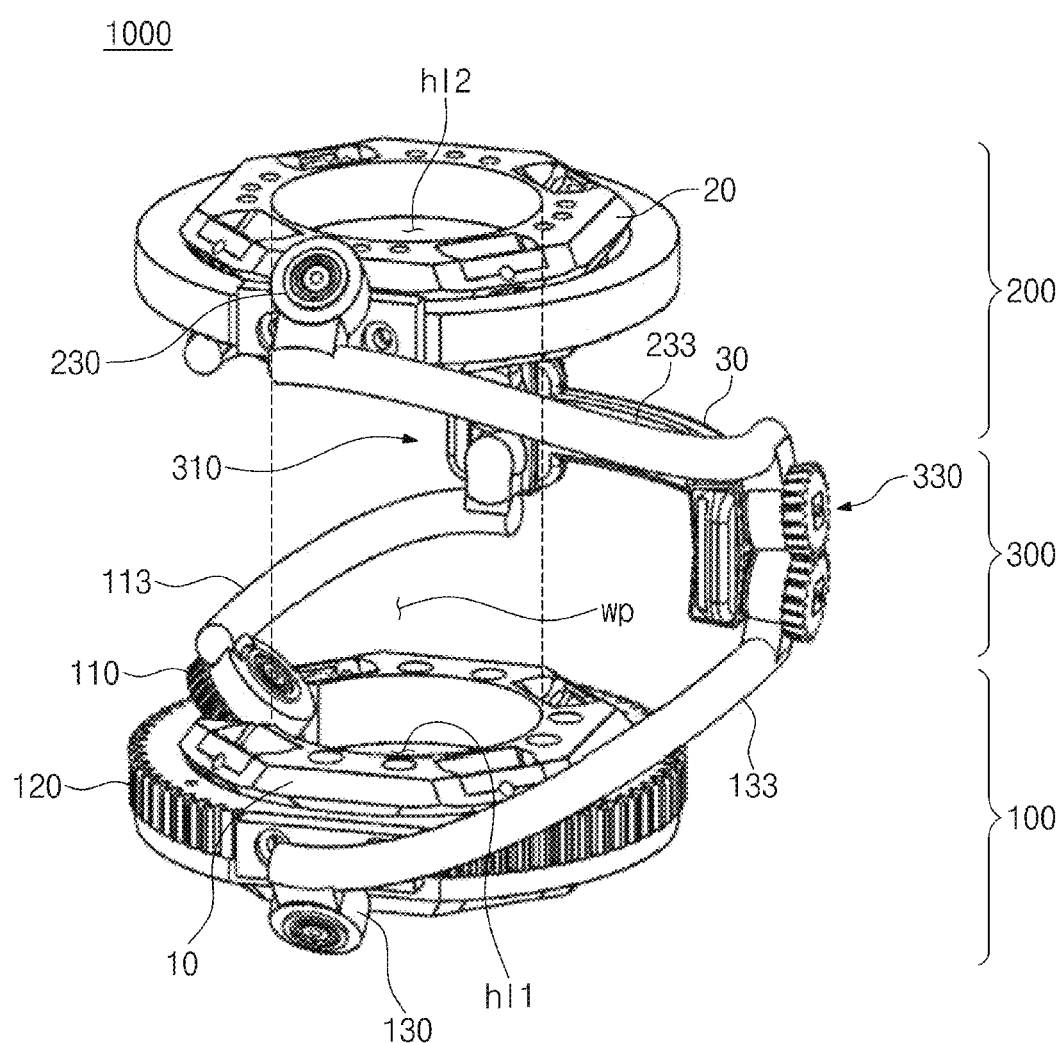
FIGS. 1 to 9 are views for explaining a parallel mechanism according to the embodiment of the present invention.

Hereinafter, exemplary embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

In the specification herein, when one component is mentioned as being on another component, it signifies that the one component may be placed directly on another component or a third component may be interposed therebetween. In addition, in drawings, the shape and the thicknesses of regions may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, the team "unit", "device", "module", or an equivalent thereof signifies a unit for processing at least one function or operation, and may be implemented in hardware or software or a combination of hardware and software.

In addition, in the following description of the embodiments of the present invention, the detailed description of known functions and configurations incorporated herein will be omitted when it possibly makes the subject matter of the present invention unclear unnecessarily.

Hereinafter, the parallel mechanism according to the embodiment of the present invention will be described with reference to the drawings.

The parallel mechanism according to the embodiment of the present invention described later is assumed as a parallel mechanism in a robot hand. More particularly, the parallel mechanism is assumed as a parallel mechanism in a robot wrist joint that can be coupled to a robot hand provided as an end effector.

FIGS. 1 to 9 are views for explaining a parallel mechanism according to the embodiment of the present invention.

Referring to FIG. 1, a parallel mechanism 1000 according to the embodiment of the present invention may include at least one of a first module 100, a second module 200, and a power transmission unit 300.

Hereinafter, each configuration will be described.

First Module 100

Referring to FIG. 1, the first module 100 may include at least one of a first plate 10, a first active rotational joint 110, a first link 113, a second active rotational joint 120, a first passive rotational joint 130, and a second link 133.

According to one embodiment, the first plate 10 may be provided as a base surface for the parallel mechanism of the robot wrist joint according to the embodiment of the present invention.

A forearm of a robot arm may be coupled to one side of the first plate 10.

In addition, the first plate 10 may be famed in a symmetrical structure with respect to a second plate 20 of the second module 200 described later. A robot hand may be coupled, as an end effector ef (see FIG. 12), to one side of the second plate 20. This will be described later in more detail.

In addition, a wire wr (see FIG. 12) for driving the above-described end effector ef (see FIG. 12) may pass through the first plate 10.

To this end, as shown in FIG. 1, a first hollow hl1 may be formed inside the first plate 10.

Figure 12:
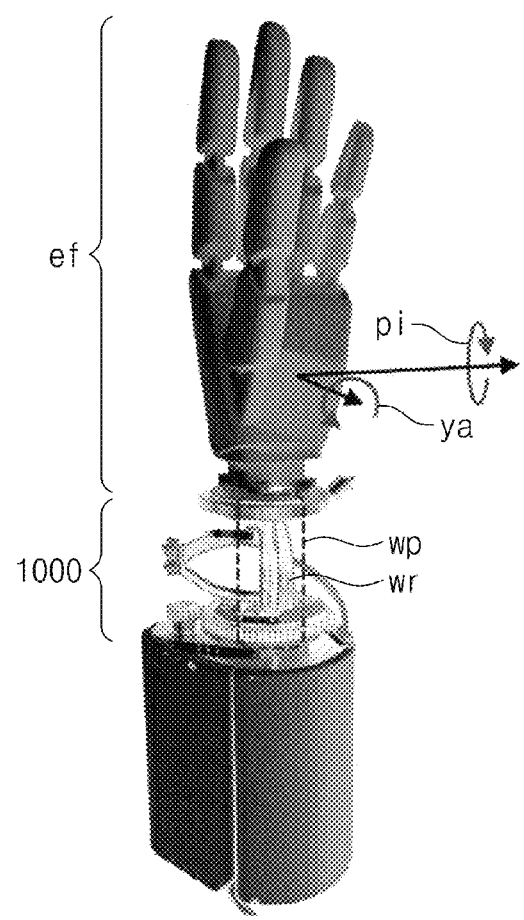

Thus, according to one embodiment of the present invention, the wire wr (see FIG. 12) for driving the end effector ef (see FIG. 12) may pass through the hollow hl1 of the first plate 10, so that constraint by the wire wr (see FIG. 12) may be minimized upon driving the end effector ef (see FIG. 12).

The first active rotational joint 110 may be provided inside the first plate 10 and rotated in a first direction.

The first direction may be the same as or opposite to a second direction described later.

To this end, the first active rotational joint 110 may be provided with a rotational force through a first rotation driving unit.

Figure 9:
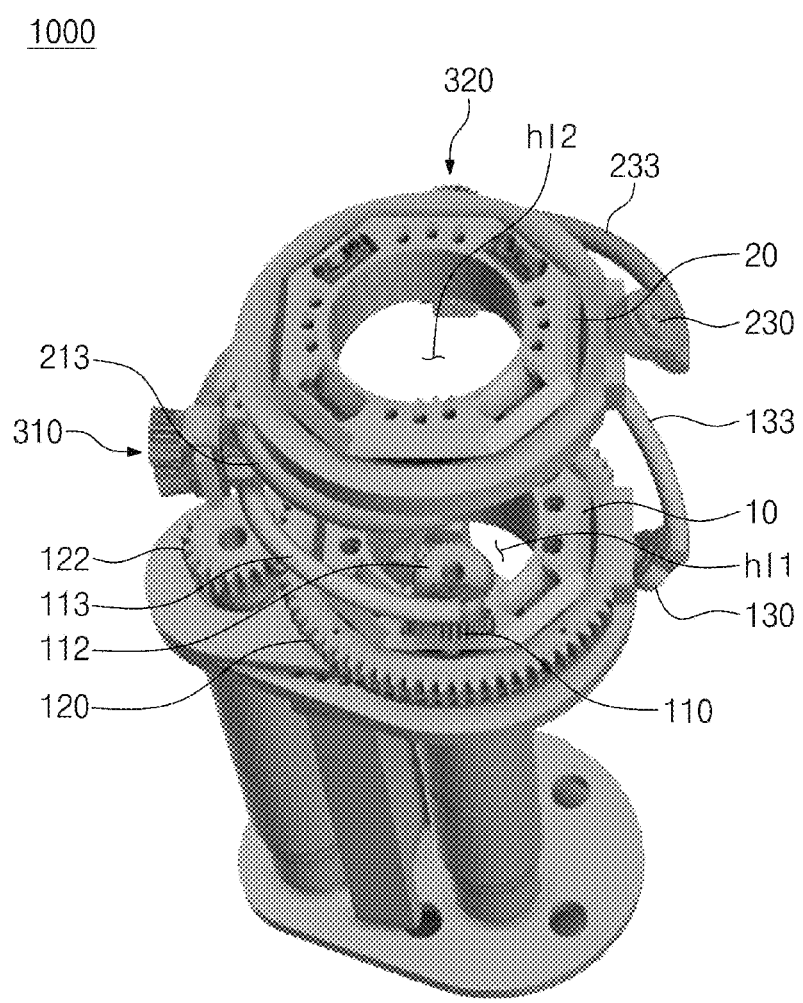

Referring to FIG. 9, the first rotation driving unit may be configured to include at least one of a first motor (not shown) including a first rotational shaft, and a first transmission gear 112 (see FIG. 9) for transmitting the rotational force of the first rotational shaft to the first active rotational joint 110.

Accordingly, the first active rotational joint 110 may be provided with the rotational force through the first transmission gear 112 (see FIG. 9), so as to be rotated in the first direction.

In addition, the first active rotational joint 110 may be formed at an obtuse angle with the first transmission gear 112 (see FIG. 9).

In addition, the first link 113 described later may have a shape of a rim or skeleton.

Accordingly, a motion range of the first link 113 connected to the first active rotational joint 110 formed at an obtuse angle with the first transmission gear 112 (see FIG. 9) as described above may be widened, and the first link 113 may be precisely controlled.

In addition, when the motion range is widened as described above, a motion range of an end effector of (see FIG. 12) coupled to one side of the second plate 20 described later may be widened.

The first link 113 may transfer the rotational motion in the first direction from the first active rotational joint 110 to a first power transmission unit 310 described later.

To this end, one end of the first link 113 may be connected to the first active rotational joint 110, an opposite end of the first link 113 may be connected to a first power transmission unit 310 described later.

The second active rotational joint 120 may be provided outside the first plate 10, and rotated in a second direction.

The second direction may be the same as or opposite to the first direction as described above.

To this end, the second active rotational joint 120 may be provided with a rotational force through a second rotation driving unit.

Referring to FIG. 9, the second rotation driving unit may be configured to include at least one of a second motor (not shown) including a second rotational shaft, and a second transmission gear 122 (see FIG. 9) for transmitting the rotational force of the second rotational shaft to the second active rotational joint 120.

Accordingly, the second active rotational joint 120 may be provided with the rotational force through the second transmission gear 122 (see FIG. 9), so as to be rotated in the second direction.

In addition, as shown in FIG. 9, the second transmission gear 122 may be engaged with one side of the second active rotational joint 120, and a first passive rotational joint 130 described later may be engaged with an opposite side of the second active rotational joint 120.

In addition, the second active rotational joint 120 and a first passive rotational joint 130 described later may form an obtuse angle.

In addition, the second link 133 described later, may have a shape of a rim or skeleton.

Accordingly, a motion range of the second link 133 connected to the first passive rotational joint 130 forming an obtuse angle with the second active rotational joint 120 as described above may be widened, and the second link 133 may be precisely controlled.

In addition, when the motion range is widened as described above, a motion range of an end effector of (see FIG. 12) coupled to one side of the second plate 20 described later may be widened.

The first passive rotational joint 130 may transfer the rotational motion in the second direction from the second active rotational joint 120 to the second link 133 described later.

To this end, one side of the first passive rotational joint 130 may be connected to the second active rotational joint 120, and an opposite side of the first passive rotational joint 130 may be connected to the second link 133 described later.

The second link 133 may transfer the rotational motion in the second direction from the first passive rotational joint 130 to a second power transmission unit 330 described later.

To this end, one end of the second link 133 may be connected to the first passive rotational joint 130, and an opposite end of the second link 133 may be connected to a second power transmission unit 330 described later.

Second Module 200

Referring to FIG. 1, the second module 200 may be spaced apart from the first module 100.

In addition, referring to FIGS. 2 and 3, the second module 200 may be foamed in a symmetrical structure with respect to the first module 100 about the power transmission unit 300 as a center A described later.

Accordingly, due to the symmetrical structure, the first motion range in the first module 100 may be amplified to a second motion range wider than the first motion range in the second module 200. The amplification to the second motion range wider than the first motion range may be understood as a concept including that the second motion range is amplified by twice the first motion range.

To this end, the second module 200 may include at least one of a second plate 20, a third link 213, a second passive rotational joint 210, a fourth link 233, and a third passive rotational joint 230.

According to one embodiment, the second plate 20 may be amplified to the second motion range wider than the first motion range in the first module 100 as described above.

An end effector ef (see FIG. 12) may be coupled to one side of the second plate 20. For example, a robot hand may be coupled, as an end effector ef (see FIG. 12), to one side of the second plate 20.

Accordingly, the motion range of the end effector ef (see FIG. 12) coupled to the one side of the second plate 20 may also be amplified as described above.

In addition, a wire wr (see FIG. 12) for driving the above-described end effector ef (see FIG. 12) may pass through the second plate 20.

To this end, as shown in FIG. 1, a second hollow hl2 may be formed inside the second plate 20.

Thus, according to one embodiment of the present invention, the wire wr (see FIG. 12) for driving the end effector ef (see FIG. 12) passes through the hollow hl2 of the second plate 20, so that constraint by the wire wr (see FIG. 12) may be minimized upon driving the end effector ef (see FIG. 12).

The third link 213 may transfer the rotational motion in the third direction from the first power transmission unit 310 described later to the second passive rotational joint 210 described later. The rotational motion in the third direction may be understood as a concept including a reverse direction of the rotational motion in the first direction described above.

To this end, one end of the third link 213 may be connected to the first power transmission unit 310 described later, and an opposite end of the third link 213 may be connected to the second passive rotational joint 210 described later.

The second passive rotational joint 210 may be provided inside the second plate 20, and may transfer the rotational motion in the third direction from the third link 213 to the second plate 20.

To this end, one side of the second passive rotational joint 210 may be connected to the third link 213, and an opposite side of the second passive rotational joint 210 may be connected to the second plate 20.

In addition, the second passive rotational joint 210 may form an obtuse angle with the second plate 20.

In addition, the third link 213 may have a shape of a rim or skeleton.

Accordingly, as described above, the motion range of the third link 213 connected to the second passive rotational joint 210 forming an obtuse angle with the second plate 20 may be widened, and the third link 213 may be precisely controlled.

The fourth link 233 may transfer the rotational motion in the fourth direction from the second power transmission unit 330 described later to the third passive rotational joint 230 described later. The rotational motion in the fourth direction may be understood as a concept including a reverse direction of the rotational motion in the second direction described above.

To this end, one end of the fourth link 233 may be connected to the second power transmission unit 330 described later, and an opposite end of the fourth link 233 may be connected to the third passive rotational joint 230 described later.

The third passive rotational joint 230 may be provided outside the second plate 20, and may transfer the rotational motion in the fourth direction from the fourth link 233 to the second plate 20.

To this end, one side of the third passive rotational joint 230 may be connected to the fourth link 233, and an opposite side of the third passive rotational joint 230 may be connected to the second plate 20.

In addition, the third passive rotational joint 230 may form an obtuse angle with the second plate 20.

In addition, the fourth link 233 may have a shape of a rim or skeleton.

Accordingly, as described above, the motion range of the fourth link 223 connected to the third passive rotational joint 230 forming an obtuse angle with the second plate 20 may be widened, and the fourth link 233 may be precisely controlled.

Power Transmission Unit 300

Referring to FIG. 1, the power transmission unit 300 may be provided in a spaced space between the first and second modules 100 and 200, and may include a third plate 30 connecting the first and second modules 100 and 200 in parallel.

In addition, as described above, the first hollow hl1 may be formed in the first plate 10 of the first module 100, and the second hollow hl2 may be foamed in the second plate 20 of the second module 200. As shown in FIG. 1, a working space wp may be formed in a space communicating between the first and second hollows hl1 and hl2.

Accordingly, the wire wr (see FIG. 12) for driving the end effector ef (see FIG. 12) may pass through the working space wp.

In addition, as described above, since the wire wr (see FIG. 12) may pass through the second hollow hl2 and the first hollow hl1, as a result, the wire may pass through the second hollow hl2, the working space wp, and the first hollow hl1.

As shown in FIG. 1, the third plate 30 may be provided outside the working space wp.

Accordingly, when the end effector ef (see FIG. 12) is driven, the wire wr (see FIG. 12) for driving the end effector ef (see FIG. 12) may be positioned in the working space wp.

Thus, according to one embodiment of the present invention, the wire wr (see FIG. 12) for driving the end effector ef (see FIG. 12) may pass through the second hollow hl2, the working space wp and the first hollow hl1. In addition, when the end effector ef (see FIG. 12) is driven, the wire wr (see FIG. 12) may be positioned in the working space wp, so that constraint by the wire wr (see FIG. 12) may be minimized upon driving the end effector ef (see FIG. 12).

Figure 2:
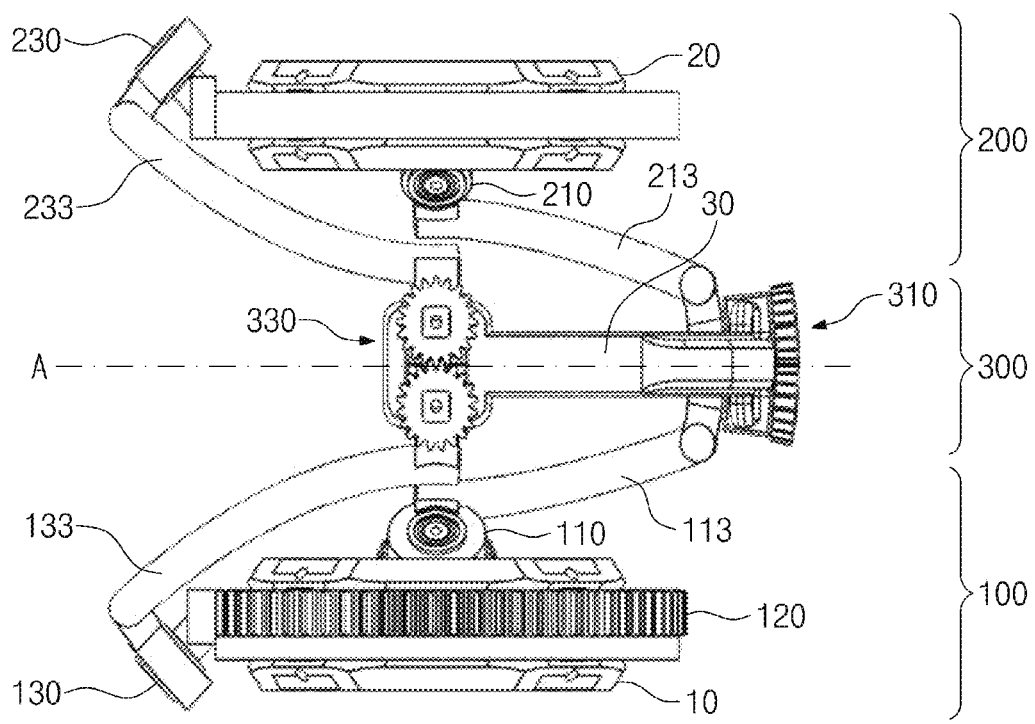
Figure 3:
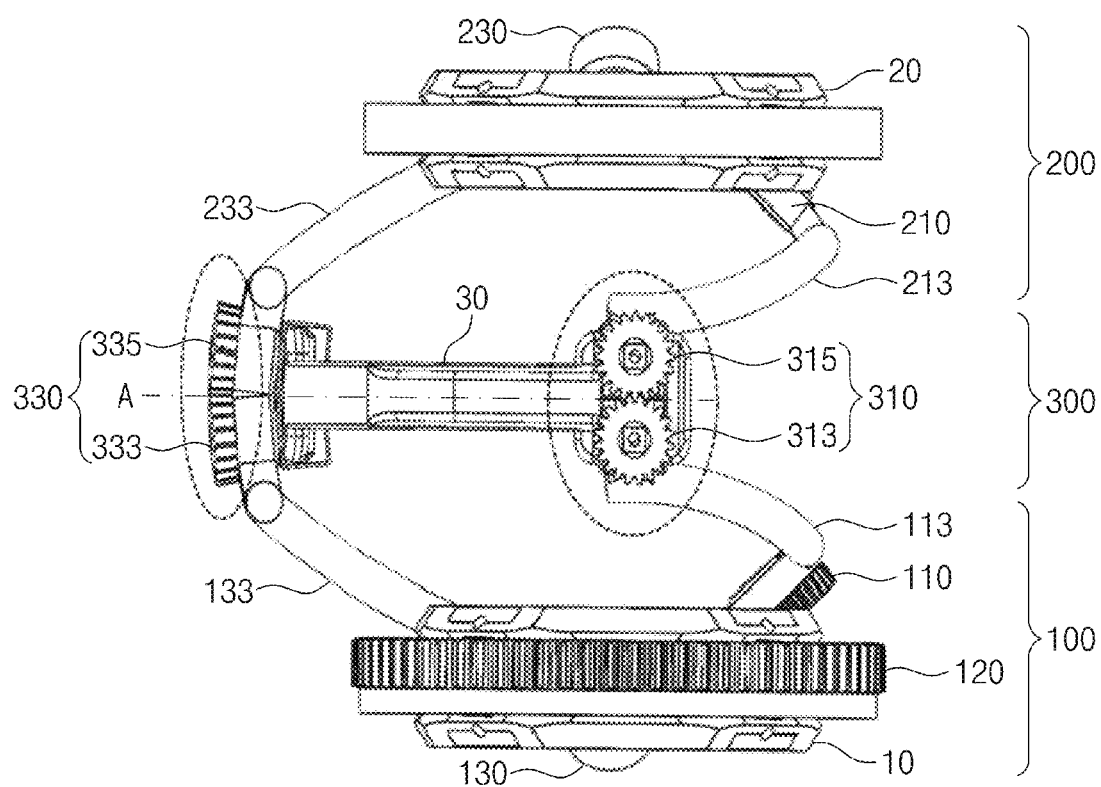

Meanwhile, referring to FIGS. 1 to 3, the third plate 30 may be provided outside the working space wp, and provided as a link shape. The link shape signifies that it may have a shape of a rim or skeleton like the above-described links.

Accordingly, the third plate 30 may have a widened motion range, and may be precisely controlled.

In addition, referring to FIGS. 2 and 3, the first and second modules 100 and 200 may be moved symmetrically around the power transmission unit 300 as the center A.

In other words, this may signify that the rotational motion in the first module 100 is converted into rotational motion in a reverse direction while being transferred to the second module 200 through the power transmission unit 300.

In other words, referring to FIGS. 2 and 3, the rotational motion in the first module 100 may be converted into the rotational motion in the reverse direction in the second module 200 through the power transmission unit 300, so that the first and second modules 100 and 200 may be moved symmetrically around the power transmission unit 300 as the center A.

In addition, the first and second modules 100 and 200 form the symmetrical structure about the power transmission unit 300 as the center A, in which, due to the symmetrical structure, the first motion range in the first module 100 may be amplified to a second motion range wider than the first motion range in the second module 200. The amplification to the second motion range wider than the first motion range may be understood as a concept including that the second motion range is amplified by twice the first motion range as described above.

To this end, referring to FIG. 3, the power transmission unit 300 may be configured to include at least one of a first power transmission unit 310 and a second power transmission unit 330.

Figure 4:
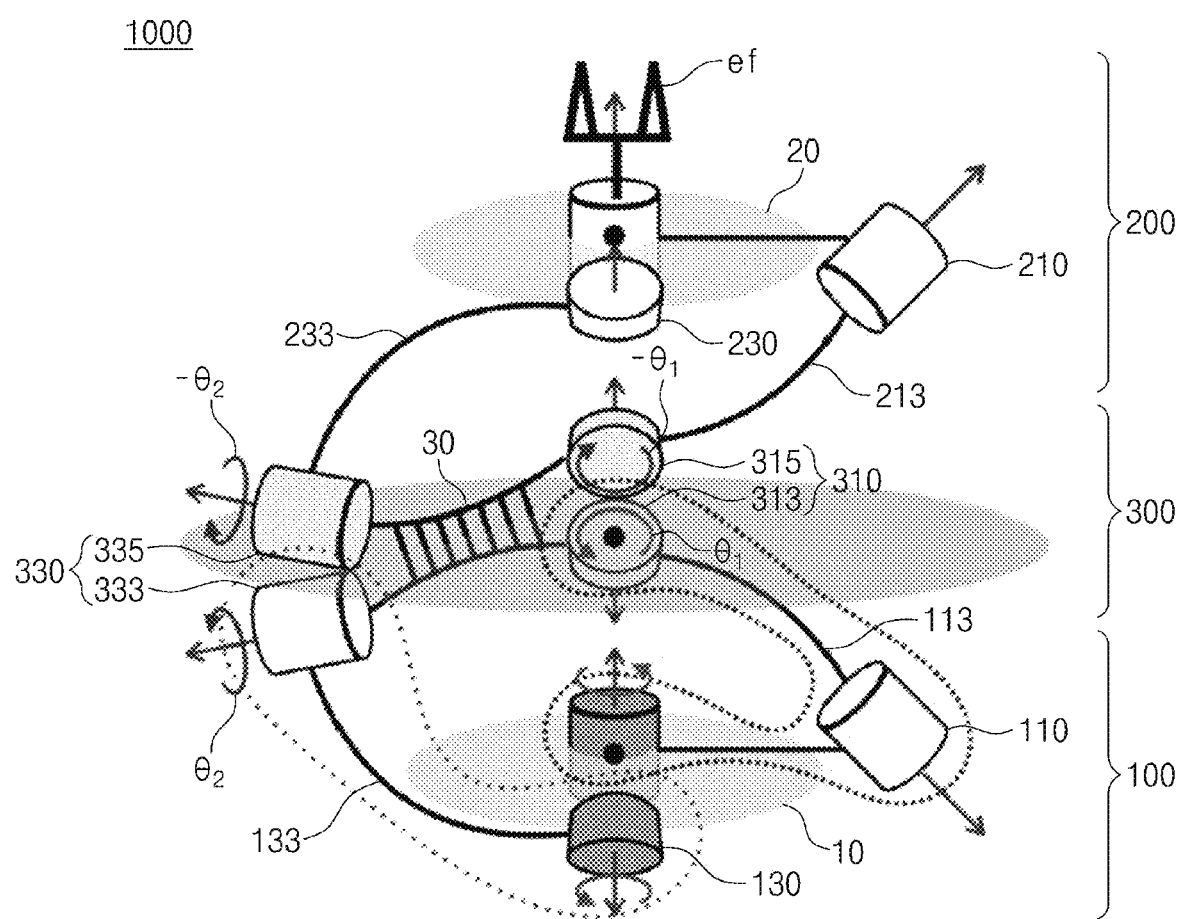

More specifically, referring to FIG. 4, the first power transmission unit 310 may be provided at one side of the third plate 30, and may convert the rotational motion in the first direction $\theta 1$ into rotational motion in the third direction $-\theta 1$, which is a reverse direction to the rotational motion in the first direction $\theta 1$.

To this end, referring to FIGS. 3 and 4, the first power transmission unit 310 may include at least one of a first gear 313 rotated in the first direction and a second gear 315 rotated in the third direction.

In addition, one side of the first gear 313 may be connected to the first link 113 described above, and the first gear 313 may be rotated while being engaged with the second gear 315.

In addition, one side of the second gear 315 may be connected to the previously described third link 213, and the second gear 315 may be rotated while being engaged with the first gear 313.

Accordingly, the rotational motion of the first module 100 in the first direction θ1 may be converted into the rotational motion of the second module 200 in the third direction θ1, through the first power transmission unit 310.

In addition, referring to FIG. 4, the second power transmission unit 330 may be provided on an opposite side of the third plate 30, and may convert the rotational motion in the second direction θ2 into rotational motion in the fourth direction −θ2, which is a reverse direction to the rotational motion in the second direction θ2.

To this end, referring to FIGS. 3 and 4, the second power transmission unit 330 may include at least one of a third gear 333 rotated in the second direction θ2 and a fourth gear 335 rotated in the fourth direction −θ2.

In addition, one side of the third gear 333 may be connected to the previously described second link 133, and the third gear 333 may be rotated while being engaged with the fourth gear 335.

In addition, one side of the fourth gear 335 may be connected to the previously described fourth link 233, and the fourth gear 335 may be rotated while being engaged with the third gear 333.

Accordingly, the rotational motion of the first module 100 in the second direction θ2 may be converted into the rotational motion of the second module 200 in the fourth direction −θ2, through the second power transmission unit 330.

Figure 5:
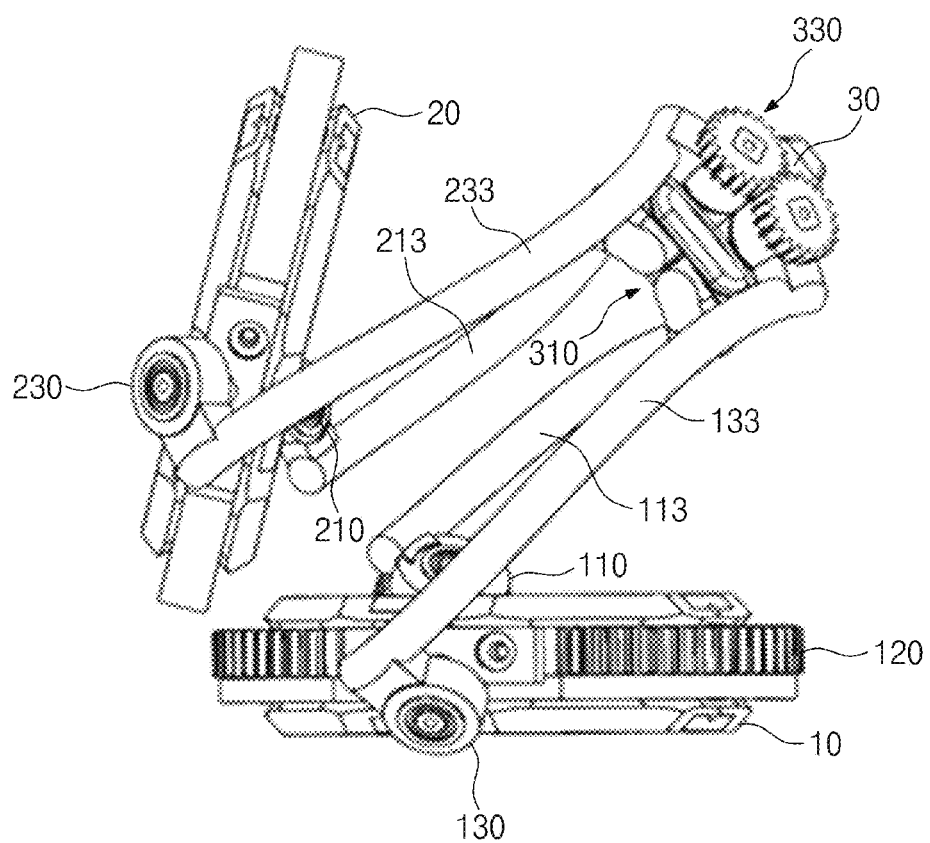
Figure 6:
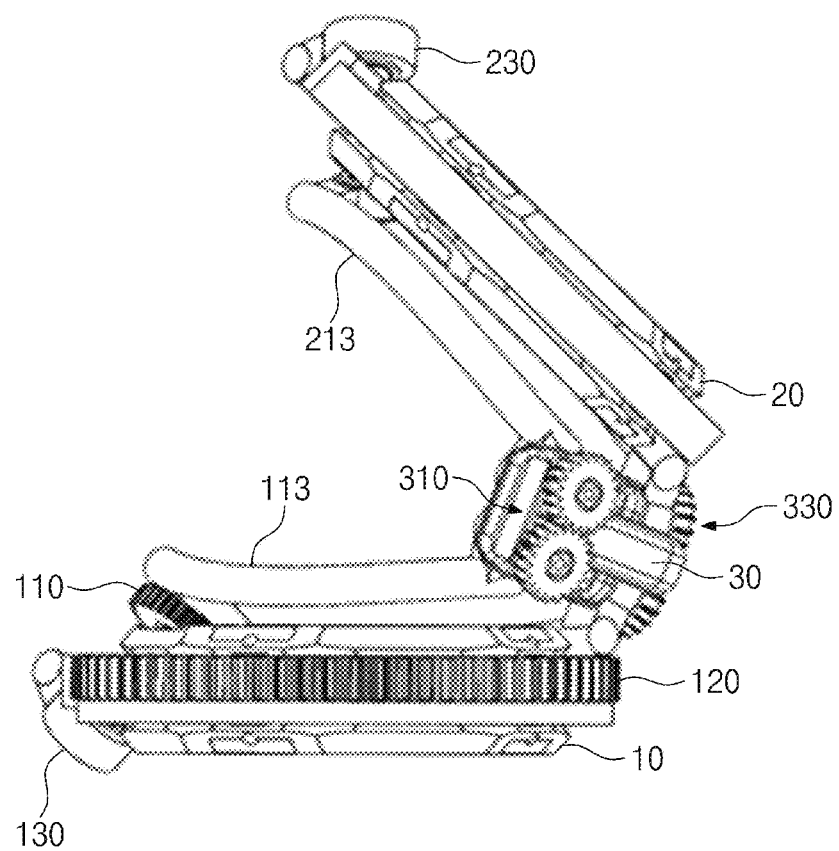
Figure 7:
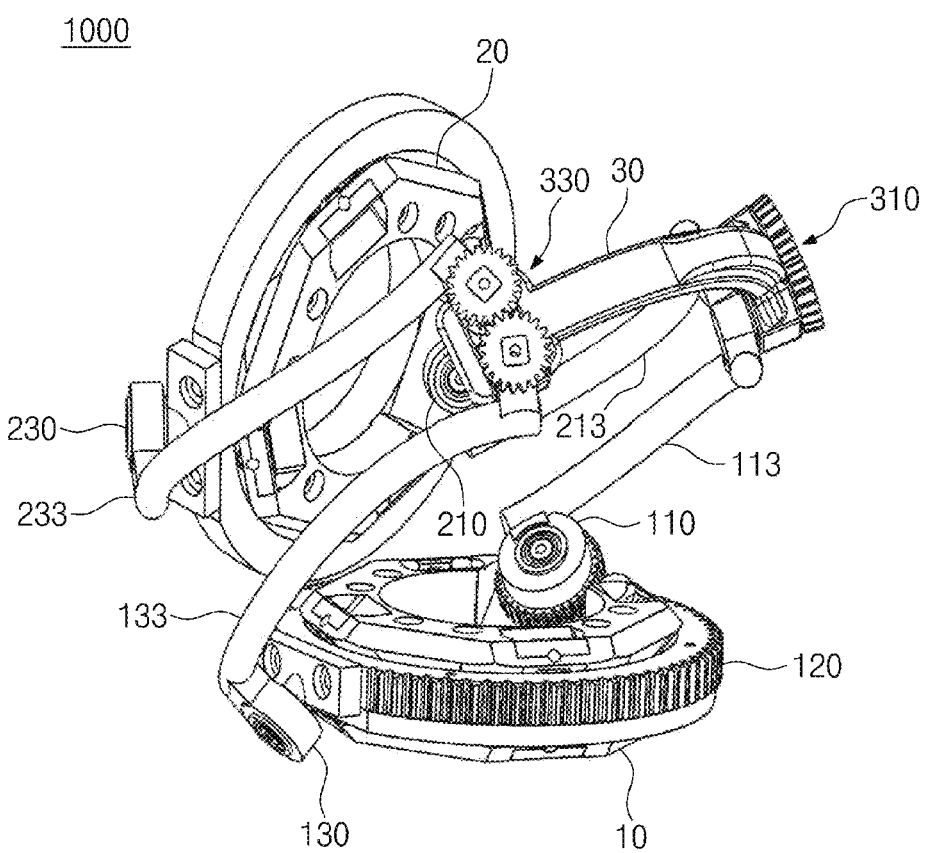
Figure 8:
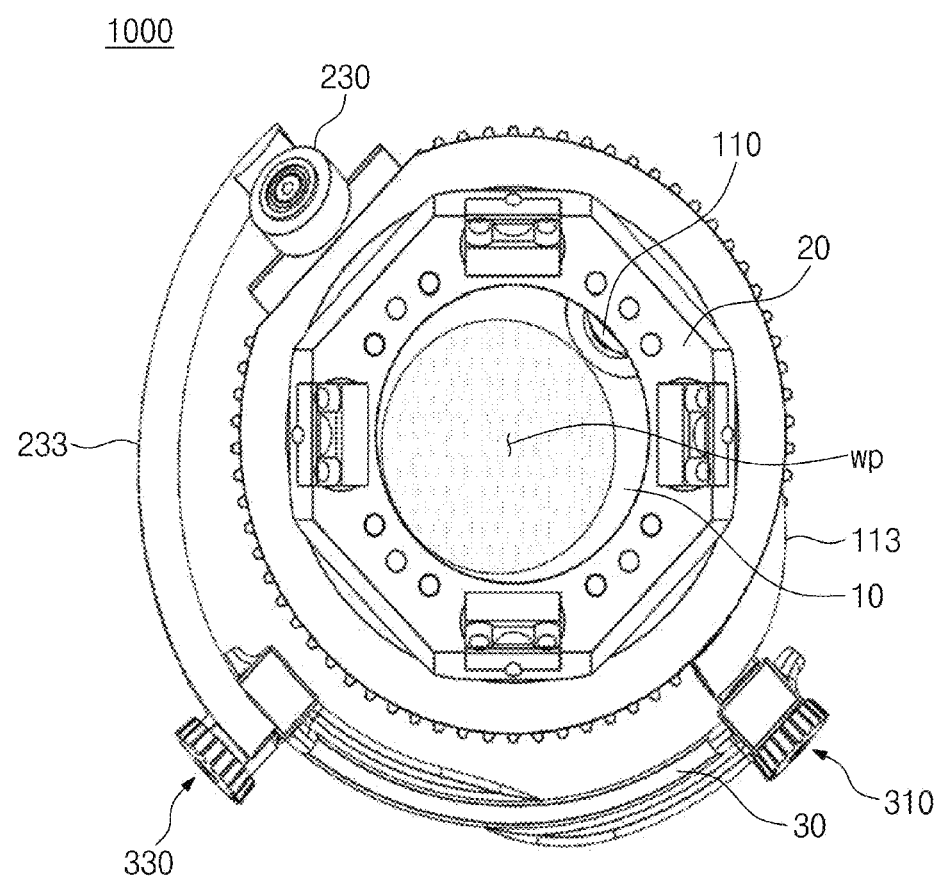

Accordingly, referring to FIGS. 5 to 8, the second plate 20 may implement various rotational motions as shown in FIGS. 5 to 7 while maintaining the working space wp which is a space communicating with the first and second hollows hl1 and hl2 shown in FIG. 8.

In addition, referring to FIG. 8, as described above, the end effector ef (see FIG. 12) may be coupled to the one side of the second plate 20, and accordingly, the wire wr (see FIG. 12) for driving the end effector ef (see FIG. 12) may pass through the working space wp, so that constraint by the wire wr (see FIG. 12) may also be minimized upon driving the end effector ef (see FIG. 12).

In addition, according to the embodiment of the present invention, the end effector ef (see FIG. 12) may have freedom degree 2 by the first and second rotation driving units.

In addition, the above freedom degree 2 of the end effector ef (see FIG. 12) may also be implemented by a combination of the rotational motion of the first active rotational joint 110 in the first direction and the rotational motion of the second active rotational joint 120 in the second direction described above.

In addition, the freedom degree 2 herein may be understood as a concept including pitch motion pi (see FIG. 12) and yaw motion ya (see FIG. 12).

More specifically, the end effector ef (see FIG. 12), by the first and second rotation driving units, may perform pitch motion pi (see FIG. 12) with a motion range of −45° or more to +90° or less and yaw motion ya (see FIG. 12) with a motion range of −65° or more to +50° or less.

In addition, even when the end effector ef (see FIG. 12) is driven with the freedom degree 2, the wire wr (see FIG. 12) may be positioned in the working space wp.

Accordingly, constraint by the wire wr (see FIG. 12) may also be minimized upon the driving of the end effector ef (see FIG. 12) with the freedom degree 2.

In addition, the end effector ef (see FIG. 12) may further perform roll-motion by the second rotation driving unit.

In this case, referring to FIG. 9, the second active rotational joint 120 may receive the rotational force through the second transmission gear 122, so as to be rotated in the second direction.

The parallel mechanism 1000 according to the embodiment of the present invention has been described.

Hereinafter, experimental examples of the present invention will described.

FIGS. 10 to 14 are views for explaining experimental examples of the present invention.

Figure 10:
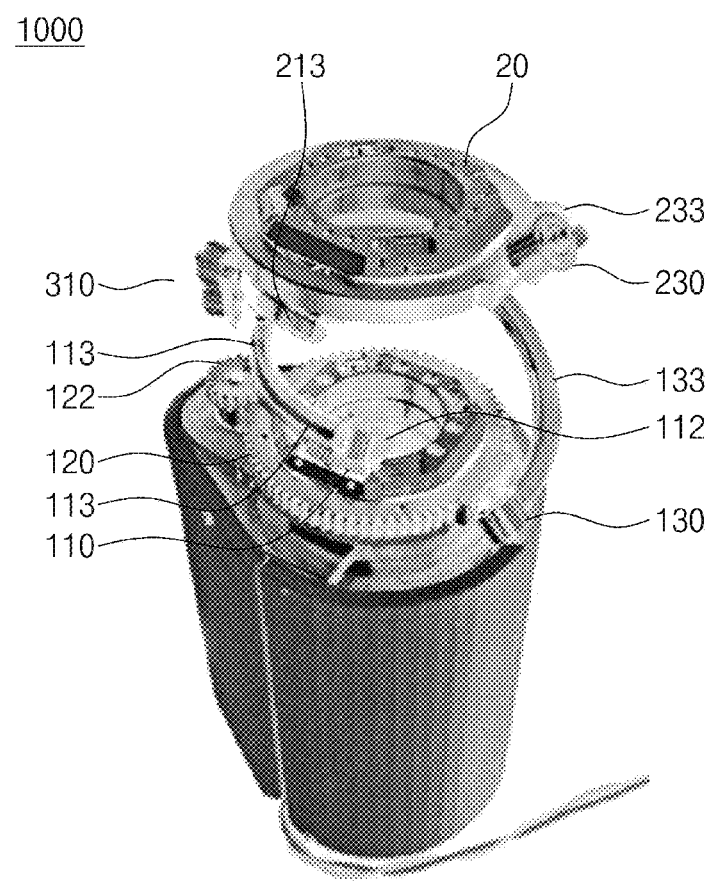
FIGS. 10 to 14 are views for explaining experimental examples of the present invention.
Figure 11:
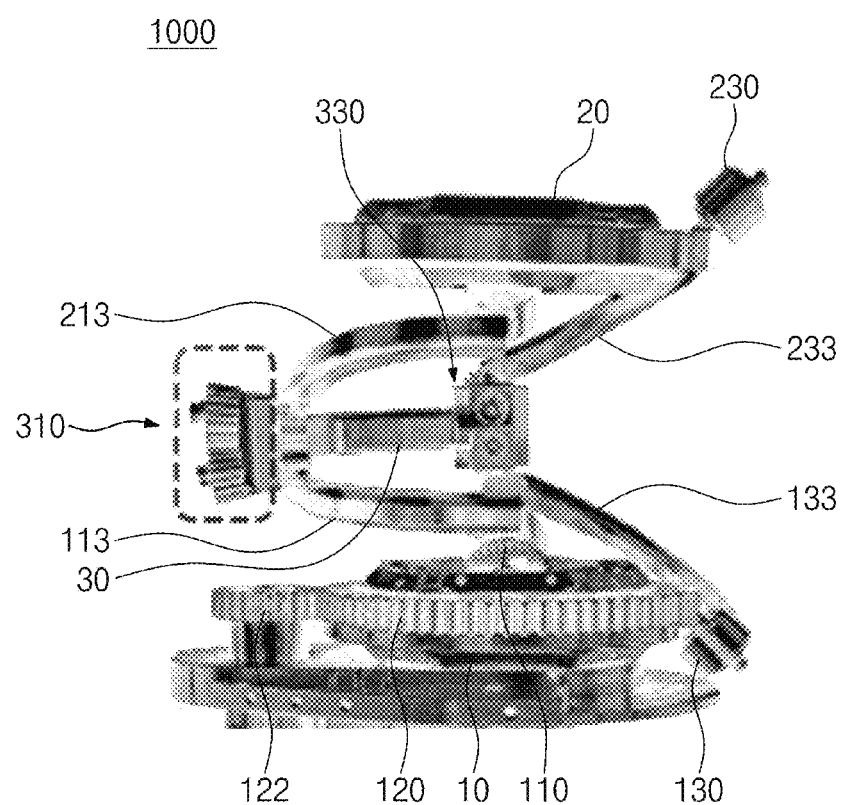

Referring to FIGS. 10 and 11, a prototype parallel mechanism 1000 including the components described above was manufactured.

In addition, referring to FIG. 12, a robot hand as an end effector ef was coupled to one side of the prototype parallel mechanism 1000 manufactured as described above, more specifically, one side of the second plate 20.

Through the robot hand as the end effector ef coupled to the prototype parallel mechanism 1000, pitch movement pi and yaw movement ya were performed and motion ranges of the pitch motion pi and the yaw motion ya were measured as shown in FIG. 12.

The range of the pitch motion (pi) was −45° or more to +90° or less, and the range of the yaw motion ya was −65° or more to +50° or less, when measured through the robot hand coupled to the prototype parallel mechanism 1000.

Figure 13:
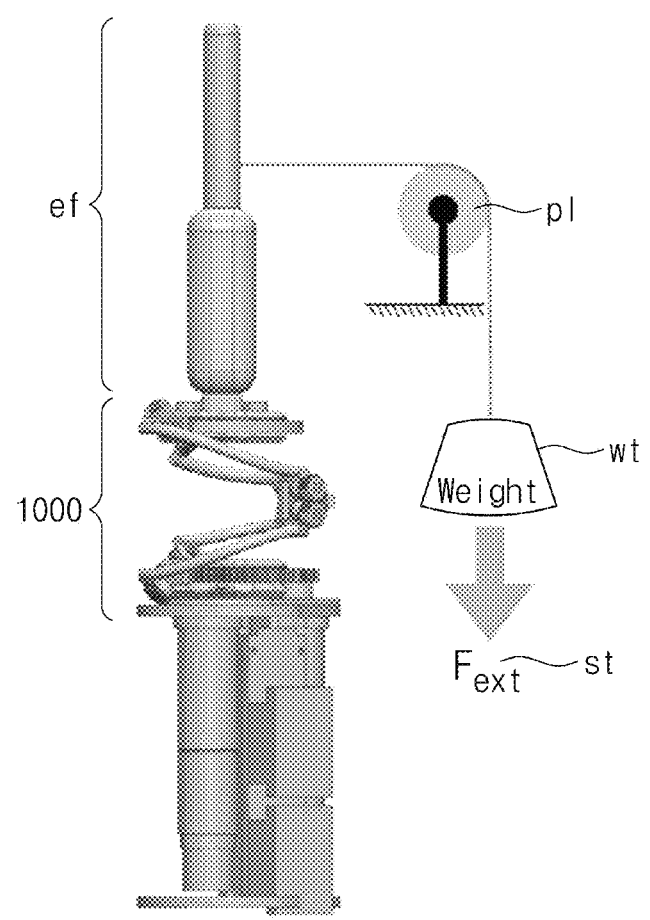

In addition, referring to FIG. 13, the stiffness st of the manufactured prototype parallel mechanism 1000 against an external force Fext was tested.

To this end, as shown in FIG. 13, a cylindrical structure as an end effector ef was coupled to one side of the manufactured prototype parallel mechanism 1000, more specifically, one side of the second plate 20, and a predetermined load wt was provided to the end effector ef, so that the stiffness st against the external force Fext of the end effector ef coupled to the manufactured prototype parallel mechanism 1000 was measured.

In addition, a pulley pl was provided between the end effector ef and the predetermined load wt.

Figure 14:
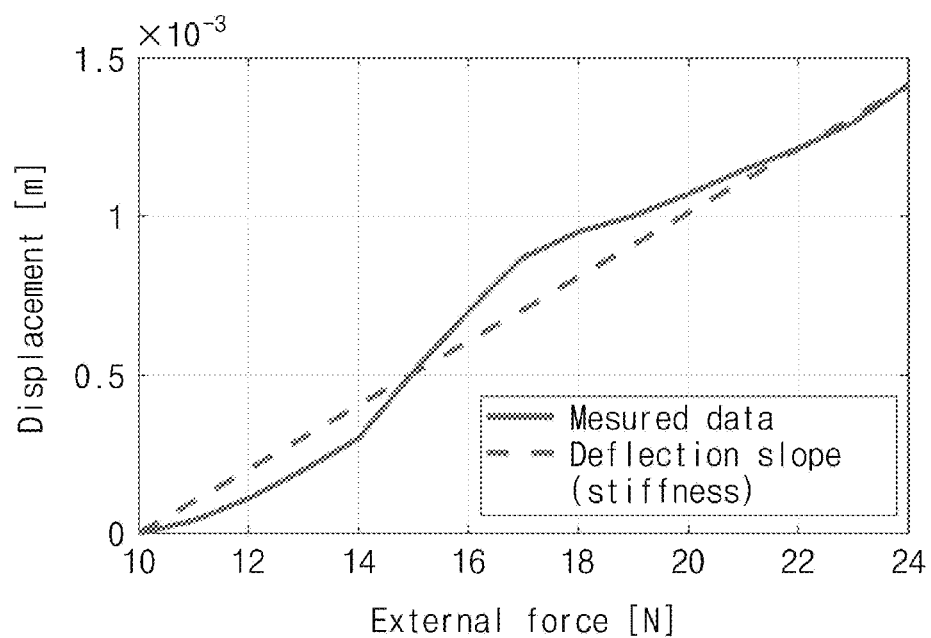

Referring to FIG. 14, the end effector ef coupled to the manufactured prototype parallel mechanism 1000 was observed as having the stiffness st corresponding to $9.3458 \times 10^3$ N/m in a range of 10 N or more to 24 N or less of the external force Fext generated by the predetermined load wt.

Through the above experimental results, it can be verified that the end effector ef coupled to the manufactured prototype parallel mechanism 1000 has a level of stiffness suitable for being implemented as a robot.

Although the present invention has been described in detail using exemplary embodiments, the scope of the present invention is not limited to the specific embodiments, and will be interpreted by the appended claims. In addition, it will be apparent that a person having ordinary skill in the art may carry out various deformations and modifications for the embodiments described as above within the scope without departing from the present invention.

The invention claimed is:

1. A parallel mechanism comprising:
a first module including a first plate having a first hollow formed therein;
a second module disposed to be spaced apart from the first module, and including a second plate having a second hollow formed therein; and a power transmission unit provided in a space between the first and second modules, and including a third plate connecting the first and second modules in parallel, wherein the first and second modules form a symmetrical structure about the power transmission unit, in which a first range of motion in the first module is amplified, by the symmetrical structure, to a second range of motion that is wider than the first range of motion in the second module, a working space is formed in a space communicating with the first and second hollows, and the third plate is provided outside the working space, and wherein the first module includes:
- a first active rotational joint provided inside the first plate and configured to be rotatable in a first direction;
- a first link for transmitting rotational motion in the first direction from the first active rotational joint;
- a second active rotational joint provided outside the first plate and configured to be rotatable in a second direction;
- a first passive rotational joint for transmitting the rotational motion in the second direction from the second active rotational joint; and
- a second link for transmitting the rotational motion in the second direction from the first passive rotational joint.

2. The parallel mechanism of claim 1, wherein the power transmission unit includes:
- a first power transmission unit provided on one side of the third plate and converting the rotational motion into the rotational motion in a third direction, which is a reverse direction of the rotational motion in the first direction; and
- a second power transmission unit provided on an opposite side of the third plate and converting the rotational motion into the rotational motion in a fourth direction, which is the reverse direction of the rotational motion in the second direction.

3. The parallel mechanism of claim 2, wherein the second module includes:
- a third link for transmitting the rotational motion in the third direction from the first power transmission unit;
- a second passive rotational joint provided inside the second plate and transmitting the rotational motion in the third direction from the third link;
- a fourth link for transmitting the rotational motion in the fourth direction from the second power transmission unit; and
- a third passive rotational joint provided outside the second plate and transmitting the rotational motion in the fourth direction from the fourth link.

4. The parallel mechanism of claim 1, further comprising:
- a first rotation driving unit for generating the rotational motion of the first active rotational joint in the first direction; and
- a second rotation driving unit for generating the rotational motion of the second active rotational joint in the second direction.

5. The parallel mechanism of claim 2, wherein the first power transmission unit includes:
- a power transmitter configured to be rotatable in the first direction; and
- a power transmitter configured to be rotatable in the third direction, and wherein the second power transmission unit includes:
- a power transmitter configured to be rotatable in the second direction; and
- a power transmitter configured to be rotatable in the fourth direction.

6. The parallel mechanism of claim 4, wherein an end effector is coupled to one side of the second plate.

7. The parallel mechanism of claim 6, wherein a wire for driving the end effector is connected to the end effector, and the wire for driving the end effector passes through the second hollow, the working space and the first hollow.

8. The parallel mechanism of claim 6, wherein the end effector has 2 degrees of freedom by the first and second rotation driving units, and when the end effector is driven with the 2 degrees of freedom, a wire for driving the end effector is positioned in the working space.

9. The parallel mechanism of claim 8, wherein the 2 degrees of freedom includes pitch motion and yaw motion, in which the pitch motion is performed in a motion range of −45° or more to +90° or less, and the yaw motion is performed in a motion range of −65° or more to +50° or less.

10. The parallel mechanism of claim 6, wherein the end effector has a stiffness in a range greater than $9 \times 10^3$ N/m and less than $10 \times 10^3$ N/m with respect to an external force in a range of 10 N or more to 24 N or less.

11. The parallel mechanism of claim 1, wherein the third plate is provided outside the working space and provided in a link shape.

* * * * *